(12) United States Patent
Toyama et al.

(10) Patent No.: US 11,148,223 B2
(45) Date of Patent: Oct. 19, 2021

(54) LASER BEAM MACHINE AND ALIGNMENT ADJUSTING METHOD

(71) Applicant: MAKINO MILLING MACHINE CO., LTD., Tokyo (JP)

(72) Inventors: Hiroshi Toyama, Aiko-gun (JP); Muneaki Beppu, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 664 days.

(21) Appl. No.: 15/547,187

(22) PCT Filed: Jan. 30, 2015

(86) PCT No.: PCT/JP2015/052765
§ 371 (c)(1),
(2) Date: Jul. 28, 2017

(87) PCT Pub. No.: WO2016/121122
PCT Pub. Date: Aug. 4, 2016

(65) Prior Publication Data
US 2017/0361399 A1    Dec. 21, 2017

(51) Int. Cl.
*B23K 26/04* (2014.01)
*B23K 26/08* (2014.01)
(Continued)

(52) U.S. Cl.
CPC ............ *B23K 26/04* (2013.01); *B23K 26/032* (2013.01); *B23K 26/082* (2015.10); *B23K 26/0853* (2013.01); *B23K 26/146* (2015.10)

(58) Field of Classification Search
CPC .... B23K 26/04; B23K 26/032; B23K 26/082; B23K 26/0643; B23K 26/702;
(Continued)

(56) References Cited

U.S. PATENT DOCUMENTS

| 2005/0205778 | A1 | 9/2005 | Kitai et al. | |
| 2007/0096763 | A1* | 5/2007 | Ehrmann | B23K 26/032 324/750.23 |
| 2010/0270273 | A1* | 10/2010 | Sekiya | B23K 26/0853 219/121.6 |

FOREIGN PATENT DOCUMENTS

| JP | 9-220685 | 8/1997 |
| JP | 2008-110348 | 5/2008 |

(Continued)

OTHER PUBLICATIONS

International Search Report dated Apr. 28, 2015, directed to International Application No. PCT/JP2015/052765; 1 page.

*Primary Examiner* — Justin C Dodson
*Assistant Examiner* — William C. Gibson
(74) *Attorney, Agent, or Firm* — Morrison & Foerster LLP

(57) ABSTRACT

This laser processing machine, which moves a work piece, which is mounted on a table, and an optical head, which shines a laser light, relative to each other, and processes the work piece by irradiating the work piece with the laser light, is provided with: a calibration camera that is fixed to the optical head; a probe that is fixed to the optical head; and a calibration unit that has measurement reference points (Pc1, Pc2, Pc3, Pp1, Pp2, Pp3) for measuring the position of the calibration camera and the probe, and a processing portion that forms a processing mark (L1, L2) due to the laser light.

5 Claims, 6 Drawing Sheets

(51) Int. Cl.
*B23K 26/146* (2014.01)
*B23K 26/03* (2006.01)
*B23K 26/082* (2014.01)

(58) Field of Classification Search
CPC ............ B23K 26/0869; B23K 26/0626; B23K 26/0648; B23K 26/10; B23K 26/083; B23K 26/704; B23K 26/03; B23K 26/0665; B23K 26/046; B23K 26/048; B23K 26/0853; B23K 26/705; B23K 26/064; B23K 26/02; B23K 26/042; B23K 26/043; B23K 26/0604; B23K 26/0093; B23K 26/035; B23K 26/0673; B23K 26/00; B23K 26/0096; B23K 26/1438; B23K 26/50; B23K 26/57; B23K 26/707; B23K 15/0013; B23K 15/02; B23K 37/04; B23K 37/0408; B29C 64/268; B29C 65/1609; B29C 65/1612; B29C 65/1616; B28B 17/0081; G05B 19/402; G05B 19/29; G05B 2219/45041; G05B 2219/36199; G05B 2219/37563; G05B 2219/40613; G05B 2219/45138; G05B 2219/4705; G05B 2219/50057; G01J 1/0411; G01J 1/4257; G01J 1/0407; G01J 1/0414; G01J 1/0448; G01J 9/00; G06T 2207/30164; G06T 2219/2004; G06T 7/13; H01L 51/0027; H01L 21/268; H01L 21/67259; H01L 21/681; H01L 21/76894; C03B 33/0222; C03B 33/091; C03B 33/082; Y10T 29/49778
USPC ........ 250/307, 309, 310, 442.11, 252.1, 282, 250/200, 208.2, 458.1, 492.1; 850/33, 52
See application file for complete search history.

(56) References Cited

FOREIGN PATENT DOCUMENTS

| | | |
|---|---|---|
| JP | 2008-264789 | 11/2008 |
| JP | 2013-132646 | 7/2013 |

* cited by examiner

LASER BEAM MACHINE AND ALIGNMENT ADJUSTING METHOD

CROSS-REFERENCE TO RELATED APPLICATIONS

This application is a U.S. National Stage Application of International Patent Application No. PCT/JP2015/052765, filed Jan. 30, 2015, which is hereby incorporated by reference in the present disclosure in its entirety.

FIELD OF THE INVENTION

The invention relates to a laser beam machine and an alignment adjusting method therefor, the laser beam machine being configured to machine a workpiece by directing the laser beam through a liquid flow in the form of a pillar formed by a liquid discharged through a nozzle, wherein the laser beam machine has an alignment adjusting function for aligning the optical axis of the laser beam and the axis of the liquid flow.

BACKGROUND OF THE INVENTION

Recently, a laser beam machine is developed, in which the dimensions and shape of a workpiece mounted to the laser beam machine are measured by a touch probe or an electric capacity sensor attached to the laser beam machine. For example, Patent Literature 1 describes a laser beam machine configured to control the gap between the laser beam machining head and the workpiece by an electric capacity sensor attached to the end of the laser beam machining head.

PATENT PUBLICATIONS

Patent Literature 1: JP-A-H09-220685

BRIEF SUMMARY OF THE INVENTION

In such a laser beam machine, provided with a touch probe or an electric capacity sensor, while the relative position between a touch probe or an electric capacity sensor and a laser beam machining head or an optical head is previously known as a designed value, an error is inevitably involved when a touch probe or an electric capacity sensor is attached to a laser beam machining head or an optical head. In the laser beam machine of Patent Literature 1, the optical axis of the laser beam irradiated from the laser beam machining head and the position of the electric capacity sensor relative to the Z-axis position of the end of laser beam machining head are not measured, and therefore the dimensions and shape of the workpiece measured by the electric capacity sensor includes errors based on the error involved when the electric capacity sensor is attached to the laser beam machining head. The measurement results including such errors cause the machining accuracy to be lowered.

The invention is directed to solve the problem of the prior art, and the objective of the invention is to provide a laser beam machine and a laser beam machining method improved to measure the position of the touch probe relative to the optical axis of the laser beam, whereby machining with higher accuracy.

In order to achieve the above described object, according to the invention, a laser beam machine configured to move a workpiece mounted to a table and an optical head for irradiating a laser beam to the workpiece, whereby machining the workpiece, comprising an optical sensor secured to the optical head, a probe secured to the optical head, and a calibration unit having a measurement reference for measuring positions by the optical sensor and the probe, and a to-be-processed part adapted to form a machined mark by the laser beam is provided.

Further, according to the invention, a laser machining method for machining a workpiece by moving a workpiece attached to a table and an optical head configured to irradiate laser beam relatively to each other, and irradiating the laser beam to the workpiece, the method comprising the steps of providing a calibration unit secured to the table and having a measurement reference and a to-be-processed part, forming a machined mark with the laser beam on the to-be-processed part of the calibration unit, measuring, by an optical sensor mounted to the optical head, the position of the machined mark on the to-be-processed part and the position of the measurement reference of the calibration unit, measuring the position of the measurement reference by a probe mounted to the optical head, calculating the deviation between the position of the machining point of the laser beam and the position measured by the probe, based on the position of the machined mark and the position of the measurement reference, measured by the optical sensor, and the position of the measurement reference measured by the probe, obtaining the relative positions of the workpiece and the machining point of the laser beam, based on the calculated deviation between the machining point of the laser beam and the position measured by the probe, and the position of the workpiece measured by the probe, and machining the workpiece by moving the table and the optical head relatively to each other, based on the obtained relative positions of the workpiece and the machining point of the laser beam is provided.

According to the invention, the deviation between the position of the machining point of the laser beam and the position measured by the probe is calculated by measuring the positions of the measurement reference by the optical sensor and the probe and the position the machined mark formed on the to-be-processed part by the laser beam, and the relative position between the machining point of the laser beam and the workpiece is obtained based on the deviation between the machining point of the laser beam and the measured position by the probe and the position of the workpiece measured by the probe, whereby the workpiece can be machined with high accuracy by moving the table and the optical head relatively to each other, based on the obtained relative position between the workpiece and the machining point of the laser beam.

DETAILED DESCRIPTION OF THE INVENTION

With reference to the attached drawings, a preferred embodiment of the invention will be described below.

Figure 5:
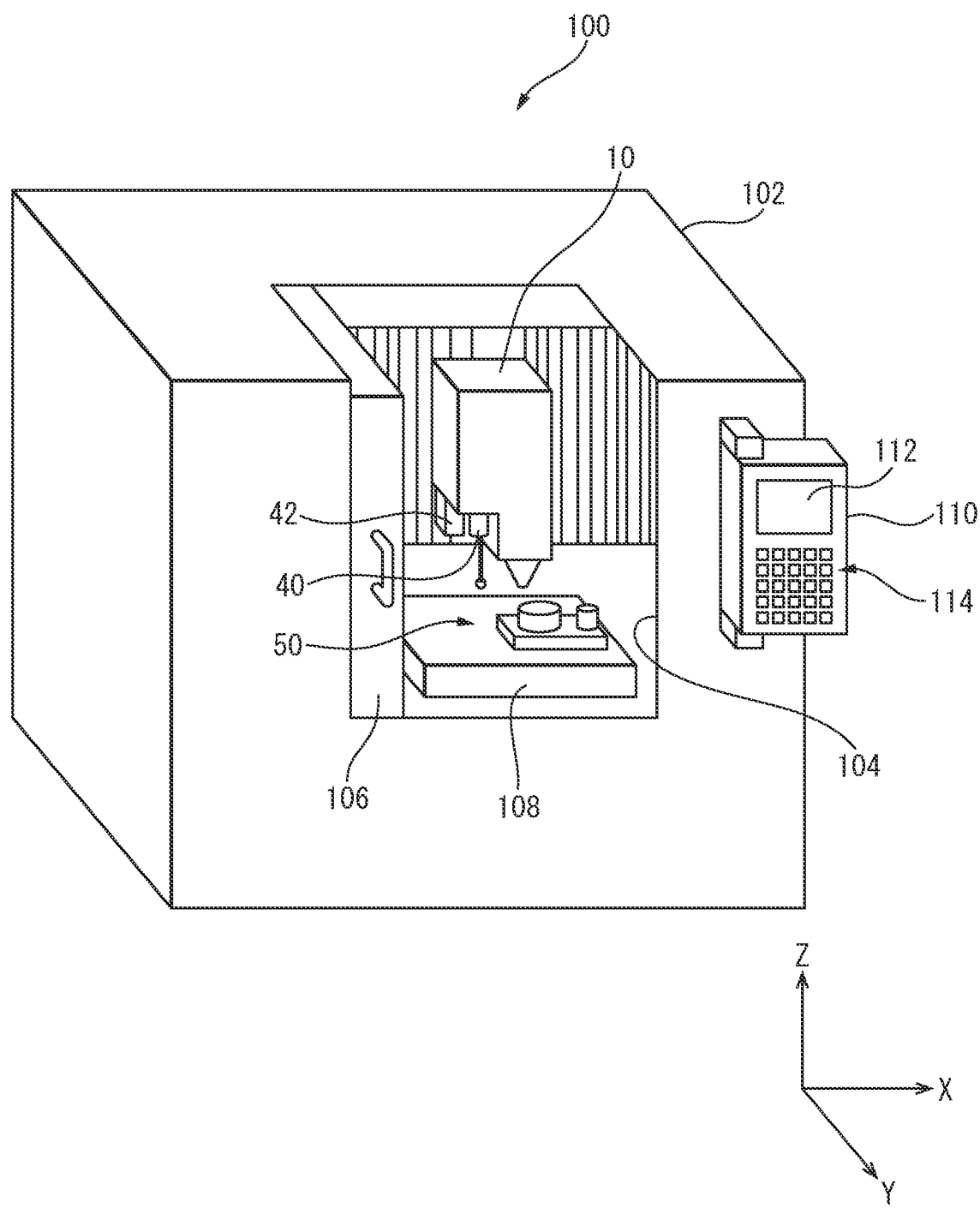
FIG. 5 is a perspective view of an example of a laser beam machine to which the invention is applied.

With reference to FIG. 5, showing an example of a laser beam machine to which the invention is applied, a laser beam machine 100 comprises a table 108 to which a workpiece is attached, an optical head 10 configured to move linearly relative to the table 108 in three orthogonal X-, Y- and Z-aces directions. The optical head 10 and the table 108 are enclosed by a cover 102. The cover 102 has a safety door 106, slidable in the right-left direction (X-axis direction). Opening the safety door 106 allows an operator to access the optical head 10 and the table 108 through an opening 104. The table 108 is provided with a calibration unit 50.

An operating panel 110 for the laser beam machine 100 is mounted to a front side wall of the cover 102. The operating panel 110 has a display 112, adapted to display parameters, indicating the condition and operation of the laser beam machine 100, icons for teaching an operator the operation procedures and so on, and a various operating buttons 114. The display 112 may be a touch panel, adapted to allow an operator to carry out a various operation to the laser beam machine 100 by touching an icon with his (her) finger. Further, the operating panel 110 is incorporated with a controller for controlling the laser beam machine 100 in accordance with the operator's input and a program contained in the controller.

Figure 1:
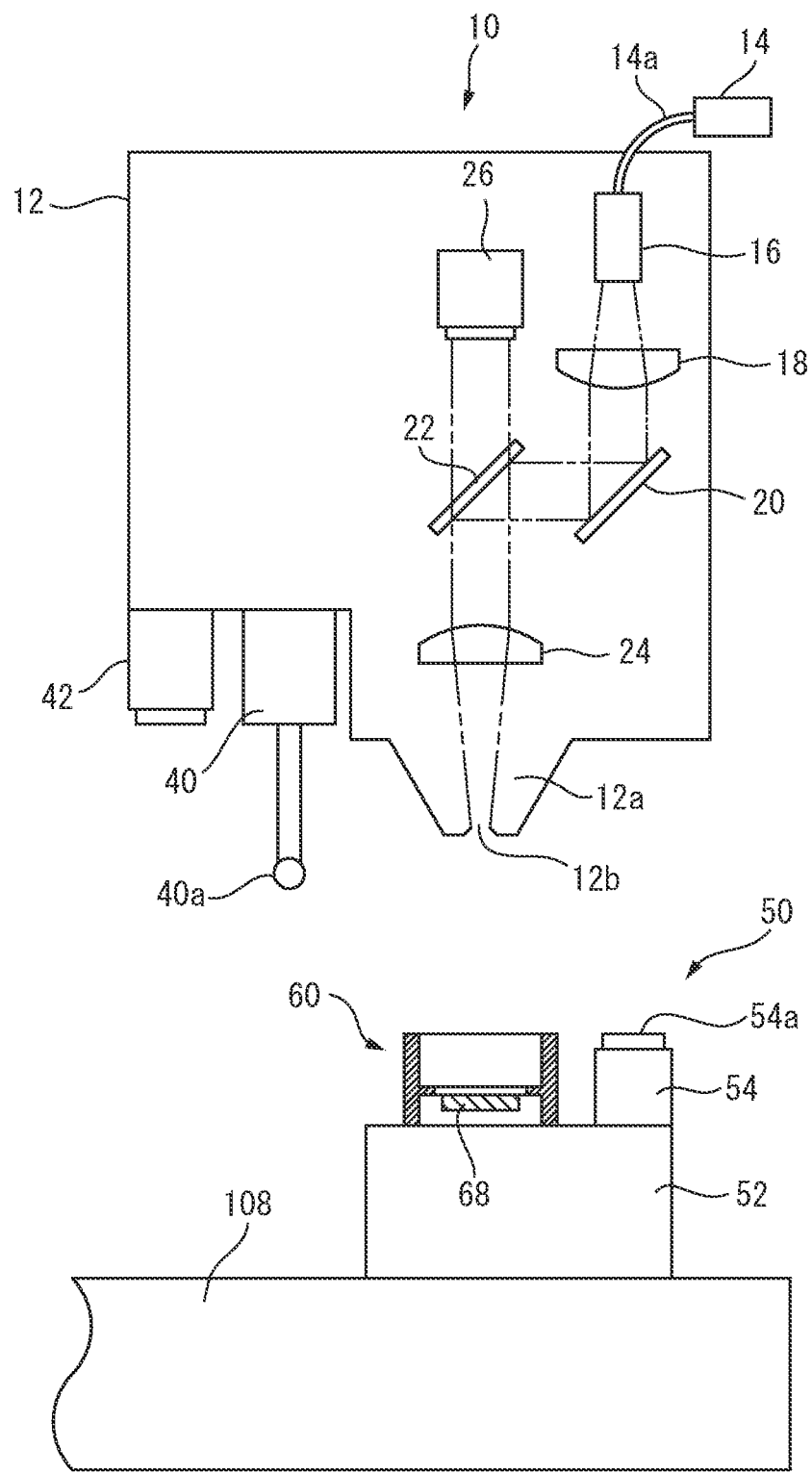
FIG. 1 is a schematic section of an example of a laser beam machine with a touch probe attached to an optical head.

The laser head 10, shown in FIG. 1 as an example, comprises a laser irradiation head 16 which is enclosed in a housing 12 and configured to receive the laser beam from a laser oscillator 14 via an optical conduit 14 such as an optical fiber, and to irradiate the laser beam toward a collimation lens 18. A downwardly tapered projection part 12a is provided at the lower end portion of the housing 12 of the optical head 10. An orifice 12b is provided at the lower end of the projection part 12a.

The laser beam from the laser irradiation head 16 is parallelized by the collimation lens 18, reflected to a second mirror 22 by a first mirror 20, and reflected toward a focus lens 24 by the second mirror 22. The laser beam is irradiated outside the housing 12 through the orifice 12b of the housing 12, after being condensed by the focus lens 24. At that time, the optical axis of the laser beam irradiated from the optical head 10 is substantially parallel to the Z-axis.

Figure 6:
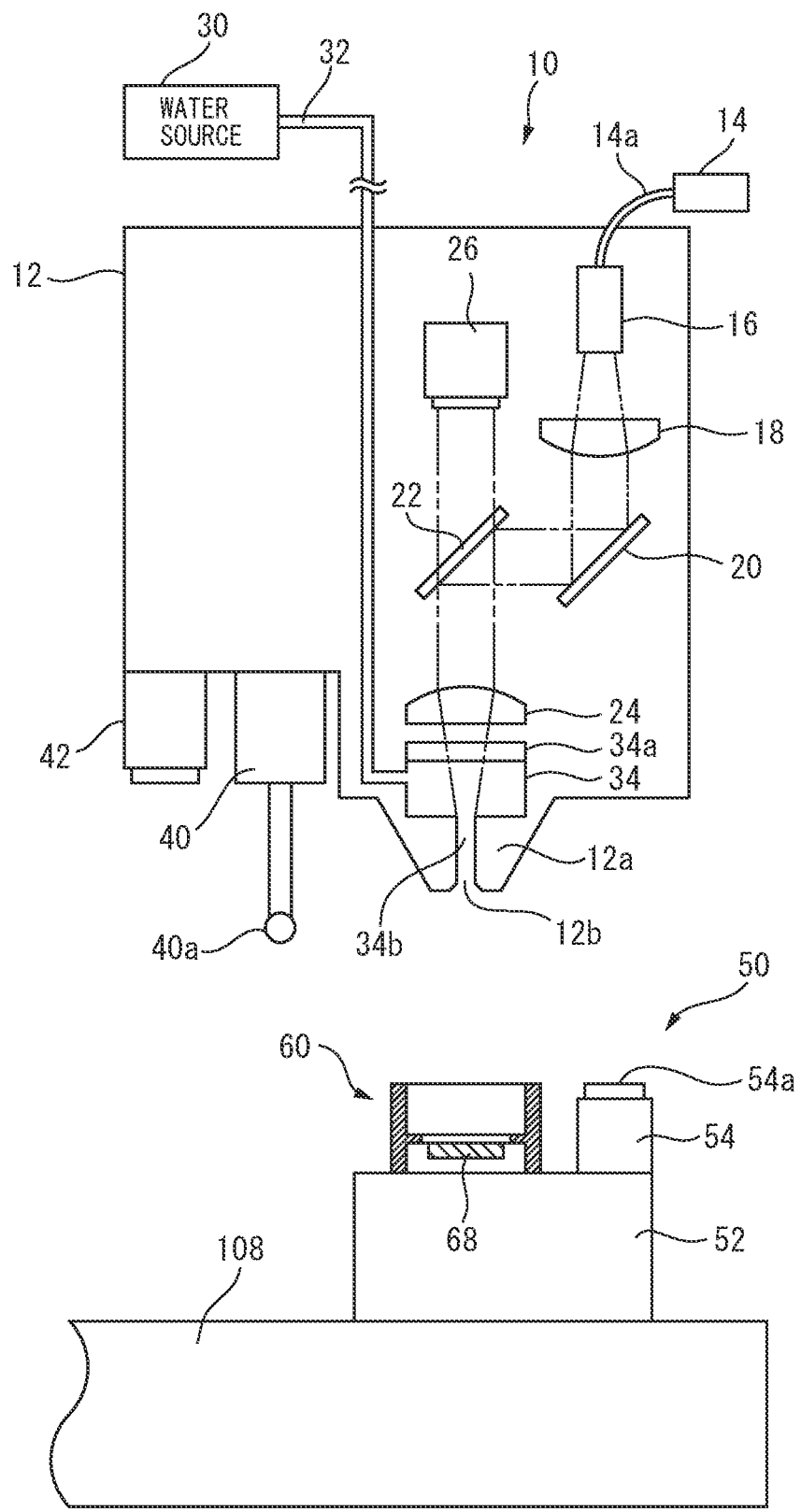
FIG. 6 is a schematic section of an optical head, similar to FIG. 1, of a water jet laser beam machine to which the invention is applied.

The optical head 10 may be a water jet laser beam machine, as shown in FIG. 6, wherein a workpiece is machined by the laser beam is directed through a pillar-like liquid jet formed by liquid discharged through a nozzle. In this connection, in the optical head 10 of FIG. 6, the elements similar to those of the optical head 10 of FIG. 1 are indicated by the same reference numbers, and the explanation thereof is omitted in order to avoid redundancy. Hereinafter, only the differences will be described.

The optical head 10 of the water jet laser beam machine, shown in FIG. 6, comprises, in addition to the optical head 10 of FIG. 1, a nozzle head 34 configured to discharge liquid, for example water, outside the housing 12. The nozzle head 34 comprises a tubular member configured to receive water supply from a water source 30 via a conduit 28. Provided in a bottom wall of the nozzle head 34, facing the table 108, is a nozzle 34b for discharging a water jet. Opposite to the bottom wall, a top wall, facing the focus lens 24, is provided with a window 34a formed of a transparent member such as glass. The nozzle 34b is fluidly communicated with the outside of the housing 12 of the optical head 10 via orifice 12b formed in the bottom wall of the housing 12.

The first and second mirrors 20 and 22 have planner reflecting surface, and motors 20a and 20b as a mirror orientation adjusting means for adjusting the orientations of the reflecting surfaces (the directions perpendicular to the reflecting surfaces), whereby adjusting the direction of the laser beam irradiated from the optical head 10. The first and second mirrors 20 and 22, in particular the second mirror 22, adapted to reflect the laser beam toward the focus lens 24, include(s) a dielectric multilayer suitable for the wave length of the laser beam irradiated from the laser oscillator 14 to reflect the laser beam and to transmit lights having wave lengths other than the wave length of the laser beam. In particular, it is formed by depositing a dielectric multilayer on a glass plate. Forming the second mirror 22 by such a dielectric multilayer enables the positions of the nozzle 34b and the laser beam irradiated through the nozzle 26 to be monitored by an alignment adjusting camera 26.

The calibration unit 50 is positioned at a position on the table 108 so as to be faced to the optical head 10 by moving the optical head 10 and the table 108 relatively to each other by three feed axes of X-, Y- and Z-axes of the laser beam machine 100. The calibration unit 50 comprises a base member 48 configured to be secured to the table 108, an annular lower holding member 46 secured to a top face of the base member 48, an annular upper holding member 44 detachably attached to the lower holding member 46, a reflecting plate 42 held between the upper and lower holding members 44 and 46, and an annular light shielding member 34 fixed to a top face of the upper holding member 44.

On the lower end portion of the housing 12 of the optical head 10, a touch probe 40, having a contactor 40 for measuring the dimension and shape of a workpiece (not shown) attached to the table 108, and a calibration camera 42, providing an optical sensor, are mounted. The contactor 40a of the touch probe 40 extends downwardly in the Z-axis direction. The calibration camera 42 is oriented so that its optical axis is aligned with the Z-axis direction.

The calibration unit 50 is positioned at a position on the table 108 so as to be faced to the optical head 10 by moving the optical head 10 and the table 108 relatively to each other by the three orthogonal X-, Y- and Z-aces feed devices of the laser beam machine 100. The calibration unit 50 comprises a base member 52 configured to be secured to the table 108, a touch switch 54 secured to a top face of the base member 48, and a calibration ring assembly 60. A reacting part 54a, such as an electrostatic capacity switch or a non-contact microswitch is provided at the top end of the touch switch 54. Further, the touch switch 54 is positioned at a level the same as a top face of a plate 68, which provides a to-be-processed part of the calibration ring assembly 60, and is inserted into slots 62a.

Figure 2:
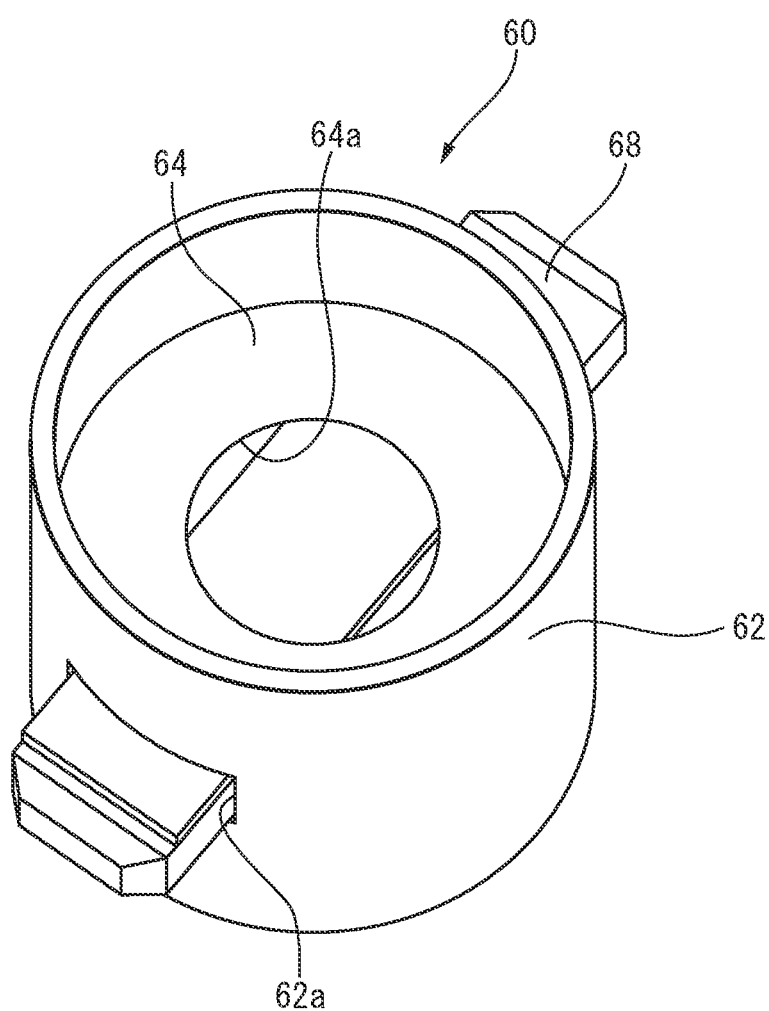
FIG. 2 is a perspective view of a calibration ring assembly according to a preferred embodiment of the invention.

With reference to FIG. 2, the calibration ring assembly 60 comprises a cylindrical body 62, an annular flange part 64 radially inwardly extending from the inner surface of the body 62, and a plate 68 providing a to-be-processed part extending in the diametrical direction of the body 62. The body 62 has a precisely machined cylindrical outer surface. Further, the cylindrical body 62 and the inner surface 64a of flange part 64 of the calibration ring assembly 60 are formed so as to be precisely concentrically aligned with each other.

A pair of slots 62a are formed at diametrically opposite sides of the body 62. The rectangular plate 68 is removably inserted into the slots 62a as a to-be-processed part. The slots 62a are disposed so as to allow the top face of the inserted plate 68 to contact intimately with the bottom face of the flange part 64. The plate 68 is composed of a metallic member, such as stainless steel, of which top surface is finished to provide a reflecting surface reflecting the laser beam irradiated from the optical head 10.

The operation of the embodiment will be described below.

When an operator presses a calibration start button on the operating panel 110, the optical head 10 starts to be moved to a calibration adjustment position by the X-, Y- and Z-axes feed devices of the laser beam machine 100. At the calibration adjustment position, the optical head 10 is located above the calibration unit 50, then lowered along the Z-axis until the projection part 12*a* of the housing 12 of the optical head 10 contacts the reacting part 54*a* of the touch switch 54. When the distal end of the projection part 12*a* contacts the reacting part 54*a* of the touch switch 54, the lowering movement of the optical head 10 is terminated, and the currently Z-coordinate is stored in the controller (not shown) of the laser beam machine 100.

Then, the contactor 40*a* of the touch probe 40 is located above the touch switch 54 of the calibration unit 50. Then, the contactor 40*a* is lowered until contacting with the touch switch 54. When the distal end of the contactor 40*a* contacts the reacting part 54*a* of the touch switch 54, the lowering movement of the optical head 10 is terminated, and the currently Z-coordinate is stored in the controller of the laser beam machine 100. The focal position of the laser beam is previously adjusted based on the distal end of the projection part 12*a* of the housing 12 of the optical head 10, thus the distance in the Z-axis direction from the distal end of the projection part 12*a* to the focal position of the laser beam is known. The distance between the focal portion of the laser beam and the contactor 40*a* in the Z-axis direction is calculated based on the Z-coordinate which is obtained when the distal end of the projection part 12*a* contacts the touch switch 54, the Z-coordinate which is obtained when the distal end of the contactor 40*a* contacts the touch switch 54, and the distance from the distal end of the projection part 12*a* to the focal position of the laser beam in the Z-axis direction.

Then, the optical head 10 is moved to a position above the plate 68 of the calibration ring assembly 60. Then, the laser beam is irradiated from the optical head 10. An image of the irradiated laser beam is captured by the alignment adjusting camera 26, and is displayed, along with the orifice 12*b*, on the display 112 of the operating panel 110 as a laser spot. The operator adjusts the alignment of the laser beam relative to the orifice 12*b* of the optical head 10 by adjusting the orientations of the first and second mirrors 20 and 22 so as to align the images of the laser spot and the orifice 12*b* with each other, which are displayed on the display 112.

Figure 3:
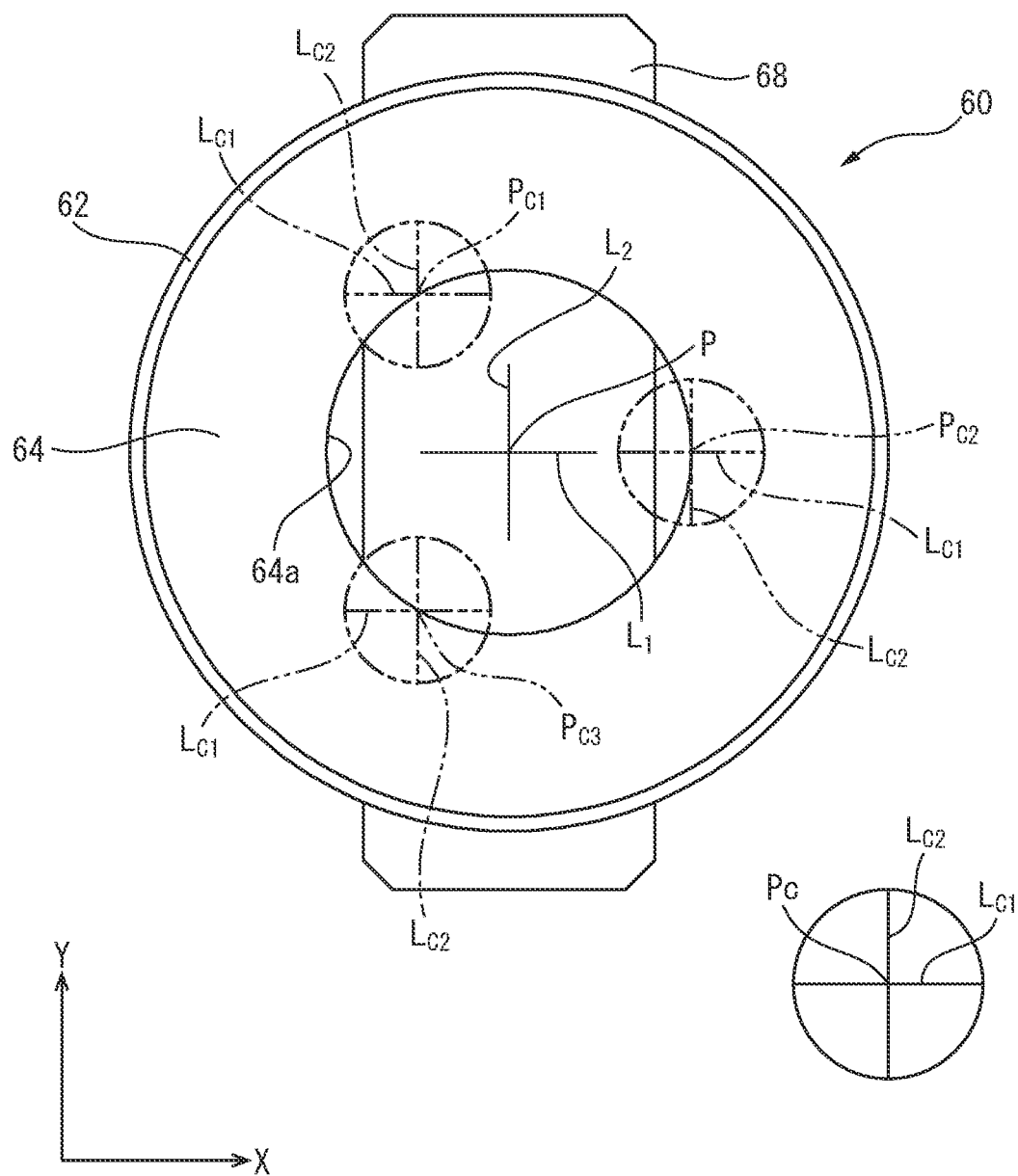
FIG. 3 is an image of the calibration ring assembly of FIG. 2 captured by a calibration camera, for explaining the measurement by the calibration camera.
Figure 4:
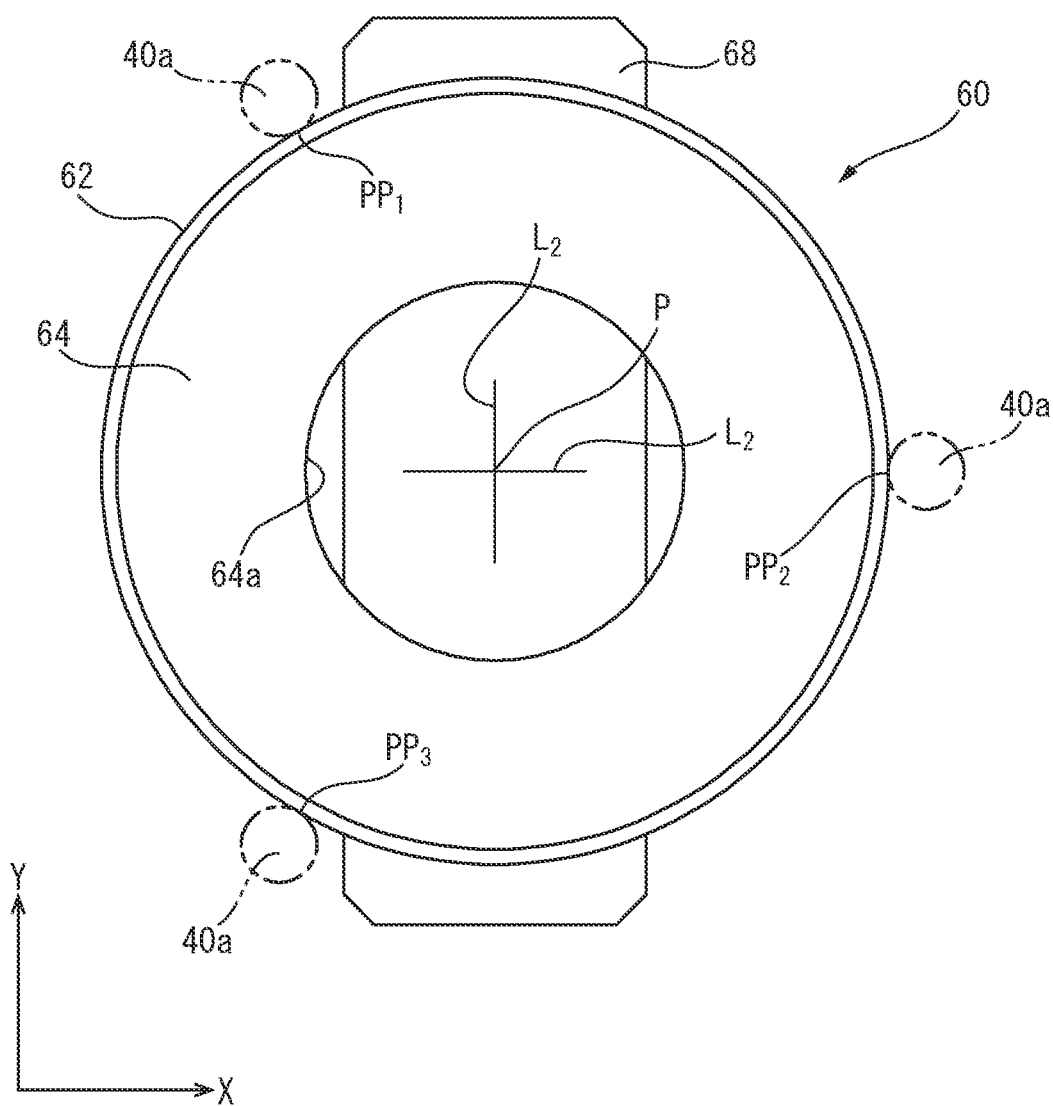
FIG. 4 is a plan view of the calibration ring assembly, for explaining the measurement by the touch probe.

Then, two lines L1 and L2 are formed perpendicularly to each other, as shown in FIGS. 3 and 4, on the top face (reflecting surface) of the plate 68, providing the to-be-processed part, by the laser beam irradiated from the optical head 10 fed in the X- and Y-axes direction relative to the table 108. At that time, the output power of the laser beam is enough to machine the lines L1 and L2, and higher than the output power irradiated for adjusting the alignment of the laser beam. The X-coordinate, when the optical head 10 is linearly fed in the Y-axis by the feed device whereby machining the line L2, and the Y-coordinate, when the optical head 10 is linearly fed in the X-axis by the feed device whereby machining the line L1, are stored as the coordinate of the intersection P between the lines L1 and L2, the laser beam aligning with the intersection.

Then, the calibration camera 42 captures an image of the top face of the plate 68 so that that the image is displayed on the display 112. At that time, on the display 112, cross lines Lc1 and Lc2 (refer to FIG. 3), indicating the optical axis of the calibration camera 42, are displayed at the center of the view field. Then, the optical head 10 is fed relative to the table 108 in X- and Y-axes so that the intersection Pc between the cross lines Lc1 and Lc2 is aligned with the intersection P between the lines L1 and L2, i.e., the machined marks formed on the to-be-processed part, whereby the optical head 10 is positioned in the X- and Y-axes directions. The deviation, in the X-Y plane, between the optical axis of the laser beam and the optical axis of the calibration camera 42 is measured by calculation based on the current X-Y coordinate and the coordinate at which the laser beam aligns with the intersection P between the lines L1 and L2.

Then, as shown in FIG. 3, three measurement points Pc1, Pc3 and Pc3 are selected, as measurement reference points for the calibration camera 42, along the inner periphery 64*a* of the flange part 64 of the calibration ring assembly 60. In FIG. 3, although the three measurement points Pc1, Pc2 and Pc3 are shown so as to be equally located at an interval along the inner periphery of the flange part 64, the present invention is not limited to this configuration, and the three measurement points Pc1, Pc2 and Pc3 can be selected at any points along the inner periphery of the flange part 64. The cross lines Lc1 and Lc2, indicating the optical axis of the calibration camera 42, are displayed on the display 112, on which the image captured by the calibration camera 42 is also displayed, as described above. The coordinates (xc1, yc1), (xc2, yc2) and (xc3, yc3) of the three measurement points Pc1, Pc2 and Pc3 are successively measured by aligning the intersection Pc between the cross lines Lc1 and Lc2 successively with the measurement points Pc1, Pc2 and Pc3. In FIG. 3, although the cross lines Lc1 and Lc2 are indicated at each measurement points Pc1, Pc2 and Pc3, for convenience of explanation, actually, only one set of cross lines Lc1 and Lc2 is displayed. The read of the X-, Y- and X-axes digital scales may be used as the coordinates of the measurement points Pc1, Pc2 and Pc3. The coordinate ($x_c$, $y_c$) of the center of a circle extending through the three measurement points Pc1, Pc2 and Pc3 is obtained the following formulations.

$$x_c = \frac{-(y_{c2} - y_{c1})y_{c3}^2 + (-y_{c2}^2 + y_{c1}^2 - x_{c2}^2 + x_{c1}^2)y_{c3} + y_{c1}y_{c2}^2 + (-y_{c1}^2 + x_{c3}^2 - x_{c1}^2)y_{c2} + (x_{c2}^2 - x_{c3}^2)y_{p1}}{(2y_{c2} - 2x_{c1})y_{c3} + (2x_{c1} - 2x_{c3})y_{c2} + (2x_{c3} - 2x_{c2})y_{c1}}$$ [Formula 1]

$$y_c = \frac{(x_{c2} - x_{c1})y_{c3}^2 + (x_{c1} - x_{c3})y_{c2}^2 + (x_{c3} - x_{c2})y_{c1}^2 + (x_{c2} - x_{c1})x_{c3}^2 + (x_{c1}^2 - x_{c2}^2)x_{c3} + x_{c1}x_{c2}^2 - x_{c1}^2 x_{c2}}{(2x_{c2} - 2x_{c1})y_{c3} + (2x_{c1} - 2x_{c3})y_{c2} + (2x_{c3} - x_{c2})y_{c1}}$$ [Formula 2]

Then, as shown in FIG. 4, three measurement points Pp1, Pp2 and Pp3 are selected, as measurement reference points for the touch probe 40, at the same level in the Z-axis direction, along the outer peripheral surface of the body 62 of the calibration ring assembly 60. In FIG. 4, although the three measurement points Pp1, Pp2 and Pp3 are shown so as to be equally located at an interval along the outer peripheral surface of the body 62, the present invention is not limited to this configuration, and the three measurement points Pp1, Pp2 and Pp3 can be selected at any points along the outer peripheral surface of the body 62, as long as they are located at the same level.

The contactor 40a of the touch probe 40 is fixed at a level in the Z-axis direction, and the contactor 40a is moved to contact successively with the three measurement points Pp1, Pp2 and Pp3 on the outer peripheral surface of the body 62 of the calibration ring assembly 60. The coordinates (xp1, yp1), (xp2, yp2) and (xp3, yp3) of the respective measurement points Pp1, Pp2 and Pp3 are measured based on the read of the X-, Y- and X-axes digital scales when the contactor 40a contacts the three measurement points Pp1, Pp2 and Pp3. The coordinate $(x_p, y_p)$ of the center of a circle extending through the three measurement points Pp1, Pp2 and Pp3 is obtained the following formulations.

$$x_p = \frac{-(y_{p2} - y_{p1})y_{p3}^2 + (-y_{p2}^2 + y_{p1}^2 - x_{p2}^2 + x_{p1}^2)y_{p3} + y_{p1}y_{p2}^2 + (-y_{p1}^2 + x_{p3}^2 - x_{p1}^2)y_{p2} + (x_{p2}^2 - x_{p3}^2)y_{p1}}{(2y_{p2} - 2x_{p1})y_{p3} + (2x_{p1} - 2x_{p3})y_{p2} + (2x_{p3} - 2x_{p2})y_{p1}}$$ [Formula 3]

$$y_p = \frac{(x_{p2} - x_{p1})y_{p3}^2 + (x_{p1} - x_{p3})y_{p2}^2 + (x_{p3} - x_{p2})y_{p1}^2 + (x_{p2} - x_{p1})x_{p3}^2 + (x_{p1}^2 - x_{p2}^2)x_{p3} + x_{p1}x_{p2}^2 - x_{p1}^2 x_{p2}}{(2x_{p2} - 2x_{p1})y_{p3} + (2x_{p1} - 2x_{p3})y_{p2} + (2x_{p3} - x_{p2})y_{p1}}$$ [Formula 4]

As described above, the cylindrical body 62 and the inner periphery 64a of the flange part 64 of the calibration ring assembly 60 are formed so as to be precisely concentrically aligned with each other, and therefore the center of the circle extending through the three measurement points Pc1, Pc2 and Pc3 and the center of the circle extending through the three measurement points Pp1, Pp2 and Pp3 must be aligned with each other, within the machining accuracy of the calibration ring assembly 60. Thus, the deviation, in the X-Y plane, between the optical axis of the calibration camera 42 and the contactor 40a of the touch probe 40 is measured by calculation based on the deviation between the coordinate $(x_c, y_c)$ of the center of a circle extending through the three measurement points Pc1, Pc2 and Pc3 and coordinate $(x_p, y_p)$ of the center of a circle extending through the three measurement points Pp1, Pp2 and Pp3.

The relative position between the workpiece, measured by the touch probe 40 and machining point of the laser beam can be obtained based on the deviation, in the X-Y plane, between the optical axis of the laser beam and the optical axis of the calibration camera 42 and the deviation, in the X-Y plane, between the optical axis of the calibration camera 42 and the touch probe 40. Laser machining can be precisely carried out by moving the optical head 10 relative to the table 108, based on the thus obtained relative position between the workpiece, measured by the touch probe 40, and machining point of the laser beam.

While the embodiment of the invention has been described in relation to the cylindrical calibration ring assembly 60 as an example, L-shaped or rectangular member, defining a measurement reference surface parallel to the Y-Z plane and a measurement reference surface parallel to the X-Z plane, may be used instead of the calibration ring assembly 60. In this case, the X-axis position of the touch probe 40 is determined by contacting the contactor 40a of the touch probe 40 with the measurement reference surface parallel to the Y-Z plane and the X-axis position of the optical axis of the calibration camera 42 is determined by aligning the cross lines of the calibration camera 42 with the measurement reference surface parallel to the Y-Z plane, whereby the deviation in the X-axis direction is calculated. In the Y-axis direction, it can be similarly calculated by using the measurement reference surface parallel to the X-Z plane. In this case, it should be noted that it is difficult to install the L-shaped or rectangular member so that the surface is completely parallel to the Y-Z plane, and therefore an orientation error may be included. On the other hand, the cylindrical calibration ring assembly 60 is not affected by an inclination around the Z-axis, achieving high-accuracy measurement of the deviation.

Further, while the embodiment of the invention has been described in relation to the calibration ring 60 having the cylindrical body 62 and the flange part 64 defining the inner periphery 64a concentric with the body, the body 62 and the inner periphery 64a of the flange part 64 may not be concentrically disposed. In this case, the deviation between the body 62 and the inner periphery 64a of the flange part 64 is previously obtained, and in the step of calculation, the deviation between the body 62 and the inner periphery 64a of the flange part 64 can be added. Concentric configuration of the body 62 and the inner periphery 64a of the flange part 64 facilitate the calculation, and allows the calibration ring assembly 60 to be machined by a lathe at higher machining accuracy.

Further, while the embodiment of the invention has been described in relation to the calibration camera 42 providing an optical sensor, the optical sensor may be a laser length-measurement sensor. When measuring with a laser length-measurement sensor, the changes in displacement is detected by scanning during moving in the X- or Y-axis direction by the feed device. The positions of the lines L1 and L2, i.e., the machined marks formed on the plate 68, and the inner periphery 64a of the flange part 64 are detected as points where the displacement changes.

REFERENCE SIGNS LIST

10 Optical Head
12 Housing
14 Laser Oscillator
16 Laser Irradiation Head
18 Collimation Lens
20 First Mirror
22 Second Mirror
24 Focus Lens
26 Alignment Adjusting Camera
30 Water Source
34
34a Nozzle
40 Touch Probe
42 Calibration Camera
50 Calibration Unit
54 Touch Switch
60 Calibration Ring Assembly
62 Body
64 Flange Part
68 Plate
100 Laser Beam Machine
108 Table
110 Operating Panel
112 Display

The invention claimed is:

1. A laser beam machine configured to move a workpiece mounted to a table and an optical head for irradiating a laser beam to the workpiece relatively to each other, whereby machining the workpiece, the laser beam machine comprising:
   an optical sensor secured to the optical head;
   a probe secured to the optical head;
   a calibration unit having a first annular measurement reference line, a position on the first annular measurement reference line being measured by the optical sensor, a second annular measurement reference line, a position on the second annular measurement reference line being measured by the probe, and a plate adapted to be machined by the laser beam to form a machined mark, wherein a position of the machined mark on the plate is measured by the optical sensor, and the first annular measurement reference line and the second annular measurement reference line are concentrically with each other; and
   a controller for calculating a separation between a position of the machined mark by the laser beam and a position of the probe for measuring the workpiece, based on the position of the machined mark relative to the optical sensor, the positions on the first annular measurement reference line which have been measured by the optical sensor, and the positions on the second annular measurement reference line which have been measured by the probe.

2. The laser beam machine according to claim 1, wherein the calibration unit comprises:
   a touch switch disposed to allow the optical head to contact the touch switch; and
   a calibration ring assembly including a cylindrical body configured to provide the second annular measurement reference line for the probe, and a flange part radially inwardly extending from the cylindrical body to provide the first annular measurement reference line for the optical sensor; and
   wherein the plate is configured to be removably inserted into the body.

3. The laser beam machine according to claim 2, wherein the flange part is formed into an annular shape having an inner periphery extending along a circle concentric with the cylindrical body of the calibration ring assembly.

4. The laser beam machine according to claim 3, wherein a center of a circle extending through three second measurement points, which are selected at any points along the outer peripheral surface of the cylindrical body, is obtained as a reference for the probe by measuring coordinates of the three second measurement points; and
   wherein a center of a circle extending through three first measurement points, which are selected at any points along the inner periphery of the flange part, is obtained as a reference for the optical sensor by measuring the coordinates of the three first measurement points.

5. A laser machining method for machining a workpiece by moving a workpiece attached to a table and an optical head configured to irradiate laser beam to the workpiece relatively to each other, the method comprising:
   providing a calibration unit secured to the table and having a first annular measurement reference line, a position on the first annular measurement reference line being measured by an optical sensor, a second annular measurement reference line, a position on the second annular measurement reference line being measured by the probe, and a plate adapted to be machined by the laser beam to form a machined mark, wherein a position of the machined mark on the plate is measured by the optical sensor, and the first annular measurement reference line and the second annular measurement reference line are concentrically with each other;
   forming the machined mark with the laser beam on the plate of the calibration unit;
   measuring, by the optical sensor mounted to the optical head, the position of the machined mark on the plate and the positions on the first annular measurement reference line of the calibration unit;
   measuring the positions on the second annular measurement reference line by the probe mounted to the optical head;
   calculating a separation between a position of the machined mark by the laser beam and a position of the probe for measuring the workpiece, based on the position of the machined mark relative to the optical sensor, the positions on the first annular measurement reference line, measured by the optical sensor, and the positions on the second annular measurement reference line measured by the probe; obtaining a relative position between the workpiece and the machined mark created by the laser beam, based on the calculated separation and the position of the workpiece measured by the probe; machining the workpiece by moving the table and the optical head relatively to each other, based on the obtained relative position between the workpiece and the machined mark created by the laser beam.

* * * * *